United States Patent
Zhang et al.

(10) Patent No.: US 10,849,090 B2
(45) Date of Patent: Nov. 24, 2020

(54) METHOD FOR OBTAINING LOCATION OF UE, AND APPARATUS

(71) Applicant: HUAWEI TECHNOLOGIES CO., LTD., Shenzhen (CN)

(72) Inventors: Jian Zhang, Shanghai (CN); Yuanjie Li, Shanghai (CN); Yongxing Zhou, Beijing (CN); Qinghai Zeng, Shanghai (CN); Ting Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 15/656,498

(22) Filed: Jul. 21, 2017

(65) Prior Publication Data

US 2017/0325057 A1 Nov. 9, 2017

Related U.S. Application Data

(63) Continuation of application No. PCT/CN2015/071353, filed on Jan. 22, 2015.

(51) Int. Cl.
*H04W 64/00* (2009.01)
*H04B 7/06* (2006.01)
(Continued)

(52) U.S. Cl.
CPC .......... *H04W 64/00* (2013.01); *H04B 7/0617* (2013.01); *H04B 7/0695* (2013.01);
(Continued)

(58) Field of Classification Search
CPC ........ Y02D 70/00; Y02D 70/10; Y02D 70/12; Y02D 70/122; Y02D 70/1224;
(Continued)

(56) References Cited

U.S. PATENT DOCUMENTS

2010/0120415 A1  5/2010  Urquhart et al.
2012/0320874 A1  12/2012  Li et al.
(Continued)

FOREIGN PATENT DOCUMENTS

EP           2748633 A1    7/2014
EP    15878388.6-1220      6/2020
(Continued)

OTHER PUBLICATIONS

Extended European Search Report, dated Jan. 2, 2018, in European Application No. 15878388.6 (10 pp.).
(Continued)

*Primary Examiner* — Erica Navar
(74) *Attorney, Agent, or Firm* — Leydig, Voit & Mayer, Ltd.

(57) ABSTRACT

The present application is applied to the communications field and provides a method for obtaining a location of UE, and an apparatus. The method includes: sending, by a base station, at least one beam, where each beam includes first beam identity information, the first beam identity information is used to uniquely identify the beam, and the beam is received by UE that is in coverage of the beam; receiving, by the base station, second beam identity information sent by the UE, and the second beam identity information is used to indicate a beam on which the UE resides; and communicating, by the base station, with the UE according to the beam which the UE resides second beam identity information sent by the UE. By means of the apparatus and the method of embodiments of the present application, location information of UE can be obtained in a millimetric wave scenario.

8 Claims, 5 Drawing Sheets

(51) Int. Cl.
*H04W 4/02* (2018.01)
*H04W 72/04* (2009.01)
*H04W 74/08* (2009.01)

(52) U.S. Cl.
CPC ............ *H04W 4/02* (2013.01); *H04W 72/046* (2013.01); *H04W 74/0833* (2013.01); *Y02D 70/00* (2018.01); *Y02D 70/10* (2018.01); *Y02D 70/12* (2018.01); *Y02D 70/122* (2018.01); *Y02D 70/124* (2018.01); *Y02D 70/126* (2018.01); *Y02D 70/1224* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/146* (2018.01); *Y02D 70/20* (2018.01); *Y02D 70/24* (2018.01); *Y02D 70/444* (2018.01)

(58) Field of Classification Search
CPC ............ Y02D 70/124; Y02D 70/1242; Y02D 70/126; Y02D 70/1262; Y02D 70/1264; Y02D 70/14; Y02D 70/142; Y02D 70/146; Y02D 70/20; Y02D 70/24; Y02D 70/444; H04W 4/02; H04W 72/046; H04W 74/0833; H04B 7/0617; H04B 7/0695
See application file for complete search history.

(56) References Cited

U.S. PATENT DOCUMENTS

| | | |
|---|---|---|
| 2013/0064239 A1 | 3/2013 | Yu et al. |
| 2013/0121185 A1 | 5/2013 | Li et al. |
| 2014/0019869 A1 | 1/2014 | Miyata |
| 2014/0177607 A1 | 6/2014 | Li et al. |
| 2014/0198696 A1 | 7/2014 | Li et al. |
| 2016/0019560 A1 | 1/2016 | Benkert et al. |
| 2016/0029358 A1* | 1/2016 | Hou ............... H04B 7/0695 370/329 |
| 2016/0195603 A1 | 7/2016 | Li |
| 2017/0033851 A1 | 2/2017 | Zhong et al. |

FOREIGN PATENT DOCUMENTS

| | | |
|---|---|---|
| RU | 2510594 | 12/2012 |
| WO | 2013185322 A1 | 12/2013 |
| WO | WO2014139174 | 9/2014 |
| WO | WO 2014/187322 A1 | 11/2014 |

OTHER PUBLICATIONS

Search Report, dated Jan. 18, 2018, in Russian Application No. 2017129346 (4 pp.).
Official Action, dated Jan. 19, 2018, in Russian Application No. 2017129346 (9 pp.).
International Search Report dated Oct. 26, 2015, in corresponding International Application PCT/CN2015/071353, filed Jan. 22, 2015.
"Part 11: Wireless LAN Medium Access Control (MAC) and Physical Layer (PHY) Specifications Amendment 3: Enhancements for Very High Throughput in the 60 GHz Band," IEEE Computer Society, IEEE Std 802.11 ad™—2012, Dec. 28, 2012.
International Search Report dated Oct. 26, 2015 in corresponding International Patent Application No. PCT/CN2015/071353.
CN/201580074233.9, Office Action, dated Oct. 24, 2019.
CN/2015878388.6, Office Action, dated May 10, 2019.

* cited by examiner

METHOD FOR OBTAINING LOCATION OF UE, AND APPARATUS

CROSS-REFERENCE TO RELATED APPLICATIONS

This application is a continuation of International Application No. PCT/CN2015/071353, filed on Jan. 22, 2015, the disclosure of which is hereby incorporated by reference in its entirety.

TECHNICAL FIELD

The present application relates to the communications field, and in particular, to a method for obtaining a location of user equipment (UE), and an apparatus.

BACKGROUND

With rapid development of packet services and intelligent terminals, high-speed services having a large data volume have an increasing requirement on spectrums. A centimetric wave frequency band usually refers to a spectrum ranging from 3 GHz to 30 GHz. A millimetric wave frequency band usually refers to a spectrum ranging from 30 GHz to 300 GHz. A centimetric wave and a millimetric wave may be collectively referred to as a millimetric wave. Because the millimetric wave has many available bandwidths, the millimetric wave becomes a potential target spectrum for future development of 5G communication and 3GPP Long Term Evolution Advanced (LTE-A). In the prior art, cellular communication such as LTE is usually performed by using a frequency band of approximately 2 GHz or even lower. An LTE-A small cell enhancements standardization program is researching and using a frequency band of 3.5 GHz. According to the IEEE 802.11ad standard, a frequency band of 60 GHz is used in a wireless local area network (WLAN), and is usually used for indoor communication of a short distance of approximately 10 meters. In the prior art, a frequency band of 6 GHz or even higher has not been used in cellular communication. A main challenge of applying a high millimetric wave frequency band to cellular communication lies in that the band has relatively large free space attenuation. In addition, a sum of attenuation caused by factors such as air absorption, and absorption and dispersion of rain, fog, a building, or another object is severe. A beamforming technology is considered as a potential technology that can resolve a problem of obvious path loss of a millimetric wave, and a large-scale multiple-input multiple-output antenna system is considered as a potential direction for implementing the beamforming technology in a millimetric wave frequency band. FIG. 1(a) is a schematic diagram of beamforming. A base station transmits beams in different directions at different moments to implement full coverage in a sector. In the prior art, beamforming is mainly implemented in two manners. One is a beam switching manner, and an analog circuit or a radio frequency circuit is usually used. The other is an adaptive beam manner, and a digital circuit is usually used.

In the prior art, cellular communication is performed in a low frequency band. A common signal such as a synchronization channel or a broadcast channel of a cell is usually transmitted by using an omni transmission manner instead of the beamforming technology.

In the prior art, a wireless local area network covers a relatively small area, and a workstation STA (station) has a relatively fixed location. Therefore, it is avoided that a beam is frequently switched in a cellular communication environment because of mobility. For example, according to 802.11ad, an optimally matched beam pair of an access point (AP) and a STA is usually obtained in a beam training manner, to obtain a beam used for data communication.

In a cellular communications system that uses a high millimetric wave frequency band, a base station uses the beamforming technology to expand coverage of a common channel, and needs to resolve problems such as how UE identifies a beam, and how the UE reports a current location of a beam to the base station to trace the beam. For example, the base station may send information only to a location of the UE. This helps the base station to save energy and reduce interference generated by an unnecessary signal. Therefore, the base station needs to obtain location information of the UE.

SUMMARY

Embodiments of the present application provide an apparatus and a method for obtaining a location of user equipment UE, to conveniently obtain location information of UE in a millimetric wave scenario.

According to a first aspect, a method for obtaining a location of user equipment UE is provided, including:

sending, by a base station, at least one beam, where each beam includes first beam identity information, the first beam identity information is used to uniquely identify the beam, and the beam is received by UE that is in coverage of the beam;

receiving, by the base station, second beam identity information sent by the UE, where the second beam identity information corresponds to the first beam identity information, and the second beam identity information is used to indicate a beam on which the UE resides; and determining, by the base station, a location of the UE according to the second beam identity information sent by the UE.

In a first possible implementation manner, before the receiving, by the base station, second beam identity information sent by the UE, the method further includes:

sending, by the base station, a request message, where the request message is used to instruct the UE to send the second beam identity information.

In a second possible implementation manner, with reference to the first aspect or the first possible implementation manner of the first aspect, after the sending, by a base station, at least one beam, the method further includes:

receiving, by the base station, a random access preamble, where the random access preamble is sent by the UE after the UE receives the beam; and determining, by the base station, the location of the UE according to the random access preamble.

In a third possible implementation manner, with reference to the second possible implementation manner of the first aspect, the determining, by the base station, the location of the UE according to the random access preamble includes:

determining, by the base station, the location of the UE according to a correspondence between the random access preamble and the beam.

In a fourth possible implementation manner, with reference to any one of the first aspect or the first to the third possible implementation manner of the first aspect, before the sending, by a base station, at least one beam, the method further includes:

processing, by the base station, each beam, so that each beam includes the first beam identity information, and the first beam identity information is used to uniquely identify the beam.

According to a second aspect, a method for obtaining a location of UE is provided, including: receiving, by UE, a beam sent by a base station, where the beam includes first beam identity information, and the first beam identity information is used to uniquely identify the beam; and sending, by the UE, second beam identity information to the base station, where the second beam identity information corresponds to the first beam identity information, and the second beam identity information is used to indicate a beam on which the UE resides, so that the base station determines a location of the UE according to the second beam identity information.

In a first possible implementation manner, before the sending, by the UE, second beam identity information, the method further includes:

receiving a request message sent by the base station, where the request message is used to instruct the UE to send the beam identity information.

In a second possible implementation manner, before the sending, by the UE, second beam identity information, the method further includes:

determining, by the UE, whether a preset reporting condition is satisfied; and when the UE determines that the preset reporting condition is satisfied, sending, by the UE, the beam identity information.

In a third possible implementation manner, with reference to the second aspect or the first or the second possible implementation manner of the second aspect, after the receiving, by UE, a beam sent by a base station, the method further includes:

sending, by the UE, a random access preamble, so that the base station determines a current location of the UE according to the random access preamble.

In a fourth possible implementation manner, with reference to the third possible implementation manner of the second aspect, the sending, by the UE, a random access preamble further includes:

if the random access preamble corresponds to the beam, sending, by the UE, the corresponding random access preamble according to a correspondence between the random access preamble and the beam.

In a fourth possible implementation manner, with reference to the third possible implementation manner of the second aspect, the sending, by the UE, a random access preamble further includes:

sending, by the UE by using an access resource specified by the base station, a random access preamble specified by the base station, so that the base station determines the location of the UE according to a direction of arrival (DOA) of a beam of the specified random access preamble.

According to a third aspect, a base station is provided, where the base station includes:

a sending module, where the sending module is configured to send at least one beam, where each beam includes first beam identity information, the first beam identity information is used to uniquely identify the beam, and the beam is received by UE that is in coverage of the beam;

a receiving module, where the receiving module is configured to receive second beam identity information sent by the UE, where the second beam identity information corresponds to the first beam identity information, and the second beam identity information is used to indicate a beam on which the UE resides; and a determining module, where the determining module is configured to determine a location of the UE according to the second beam identity information sent by the UE.

In a first possible implementation manner, the sending module is further configured to send a request message, where the request message is used to instruct the UE to send the second beam identity information.

In a second possible implementation manner, with reference to the third aspect or the first possible implementation manner of the third aspect, the receiving module is further configured to receive a random access preamble, where the random access preamble is sent by the UE after the UE receives the beam, and the determining module is further configured to determine the location of the UE according to the random access preamble.

In a third possible implementation manner, with reference to the second possible implementation manner of the third aspect, the determining module is configured to determine a direction of a beam corresponding to the random access preamble according to a correspondence between the random access preamble and the beam.

In a fourth possible implementation manner, with reference to the second possible implementation manner of the third aspect, the determining module is configured to determine the location of the UE according to a direction of arrival (DOA) of a beam of the random access preamble, where the random access preamble is specified by the base station.

In a fifth possible implementation manner, with reference to any one of the third aspect or the first to the third possible implementation manner of the third aspect, the base station further includes a processing module, where the processing module is configured to process each beam, so that each beam includes the first beam identity information, and the first beam identity information is used to uniquely identify the beam.

According to a fourth aspect, UE is provided, where the UE includes:

a receiving module, where the receiving module is configured to receive a beam sent by a base station, where the beam includes first beam identity information, and the first beam identity information is used to uniquely identify the beam;

a processing module, where the processing module is configured to generate second beam identity information, where the second beam identity information corresponds to the first beam identity information, and the second beam identity information is used to indicate a beam on which the UE resides; and a sending module, where the sending module is configured to send the second beam identity information to the base station, so that the base station determines a location of the UE according to the second beam identity information.

In a first possible implementation manner, the receiving module is further configured to receive a request message sent by the base station, where the request message is used to instruct the UE to send the second beam identity information.

In a second possible implementation manner, the processing module is further configured to determine whether a preset reporting condition is satisfied; and when the processing module determines that the preset reporting condition is satisfied, the sending module sends the second beam identity information.

In a third possible implementation manner, with reference to any one of the fourth aspect or the first or the second possible implementation manner of the fourth aspect, the sending module is further configured to send a random access preamble, so that the base station determines a current location of the UE according to the random access preamble.

In a fourth possible implementation manner, with reference to the third possible implementation manner of the fourth aspect, the processing module is further configured to command the sending module to send the corresponding random access preamble according to a correspondence between the random access preamble and the beam.

In a fifth possible implementation manner, with reference to the fourth possible implementation manner of the fourth aspect, the sending module is further configured to send, by using an access resource specified by the base station, a random access preamble specified by the base station, so that the base station determines the location of the UE according to a direction of arrival (DOA) of a beam of the specified random access preamble.

According to a fifth aspect, a base station is provided, where the base station includes:

a transmitter, where the transmitter is configured to send at least one beam, where each beam includes first beam identity information, the first beam identity information is used to uniquely identify the beam, and the beam is received by UE that is in coverage of the beam;

a receiver, where the receiver is configured to receive second beam identity information sent by the UE, where the second beam identity information corresponds to the first beam identity information, and the second beam identity information is used to indicate a beam on which the UE resides; and a processor, where the processor is configured to determine a location of the UE according to the current second beam identity information sent by the UE.

In a first possible implementation manner, the transmitter is further configured to send a request message, where the request message is used to instruct the UE to send the second beam identity information.

In a second possible implementation manner, with reference to the fifth aspect or the first possible implementation manner of the fifth aspect, the receiver is further configured to receive a random access preamble, where the random access preamble is sent by the UE after the UE receives the beam, and the processor is further configured to determine a current location of the UE according to the random access preamble.

In a third possible implementation manner, with reference to the second possible implementation manner of the fifth aspect, the processor is configured to determine a direction of a beam corresponding to the random access preamble according to a correspondence between the random access preamble and the beam.

In a fourth possible implementation manner, with reference to the second possible implementation manner of the fifth aspect, the processor is configured to determine the location of the UE according to a direction of arrival (DOA) of a beam of the random access preamble, where the random access preamble is specified by the base station.

In a fifth possible implementation manner, with reference to any one of the fifth aspect or the first to the fourth possible implementation manner of the fifth aspect, the processor is further configured to process each beam, so that each beam includes the first beam identity information, and the first beam identity information is used to uniquely identify the beam.

According to a sixth aspect, UE is provided, where the UE includes a receiver, where the receiver is configured to receive a beam sent by a base station, the beam includes first beam identity information, and the first beam identity information is used to uniquely identify the beam;

a processor, where the processor is configured to generate second beam identity information, where the second beam identity information corresponds to the first beam identity information, and the second beam identity information is used to indicate a beam on which the UE resides; and a transmitter, where the transmitter is configured to send the second beam identity information to the base station, so that the base station determines a location of the UE according to the second beam identity information.

In a first possible implementation manner, the receiver is further configured to receive a request message sent by the base station, where the request message is used to instruct the UE to send the second beam identity information.

In a second possible implementation manner, the processor is further configured to determine whether a preset reporting condition is satisfied; and when the processor determines that the preset reporting condition is satisfied, the transmitter sends the second beam identity information.

In a third possible implementation manner, with reference to the sixth aspect or the first or the second possible implementation manner of the sixth aspect, the transmitter is further configured to send a random access preamble, so that the base station determines a current location of the UE according to the random access preamble.

In a fourth possible implementation manner, with reference to the third possible implementation manner of the sixth aspect, the processor is further configured to command the transmitter to send the corresponding random access preamble according to a correspondence between the random access preamble and the beam.

In a fourth possible implementation manner, with reference to the third possible implementation manner of the sixth aspect, the transmitter is further configured to send, by using an access resource specified by the base station, a random access preamble specified by the base station, so that the base station determines the location of the UE according to a direction of arrival (DOA) of a beam of the specified random access preamble.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

It should be understood that, the technical solutions of the embodiments of the present application may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications system (UMTS), and a Worldwide Interoperability for Microwave Access (WiMAX) communications system.

In the embodiments of the present application, a base station may be a base transceiver station (BTS) in GSM or CDMA, may be a base station (NodeB) in WCDMA, or may further be an evolved NodeB (eNodeB) in LTE. This is not limited in the present application.

To make the objectives, features and advantages of the embodiments of the present application more comprehensible, the embodiments of the present application are further illustrated in detail in the following with reference to the accompanying drawings and specific embodiments.

Figure 1A:
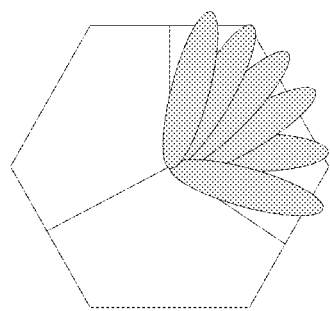
FIG. 1(a) is a schematic diagram of beamforming in the prior art.

In the embodiments of the present application, based on LTE-A carrier aggregation, a relatively-low frequency band carrier in an LTE-A technology and a millimetric wave carrier are aggregated to provide a higher bandwidth and a larger capacity for a user. The relatively-low frequency band carrier is used as a primary carrier (PCell), and the millimetric wave frequency band is used as a secondary carrier (SCell). The PCell and the SCell may be co-located or may not be co-located, and the SCell is located in coverage of the PCell, or coverage of the PCell and the SCell overlaps. In a case of non-co-location, an LTE-A base station that provides the PCell and one or more millimetric wave small cells or remote radio heads (RRH) that provide one or more SCells are connected by using fibers or in a wireless manner for backhaul communication. The backhaul communication may be performed by using a microwave band or a millimetric wave band, which may be the same as or different from a band in which the SCell is located. The embodiments of the present application are also applicable to a scenario in which a millimetric wave base station provides a PCell. The present application uses beamforming of a common channel as an example, and is also applicable to beamforming of a service channel. FIG. 1(a) is a schematic diagram of beamforming according to an embodiment of the present application. The base station transmits beams in different directions at different moments to implement full coverage in a sector. Beamforming in this embodiment may be performed in two manners. One is a beam switching manner, and an analog circuit or a radio frequency circuit may be used. The other is an adaptive beam, and a digital circuit is usually used. A beamforming technology used in the embodiments of the present application may refer to a horizontal beam or a vertical beam.

Figure 1B:
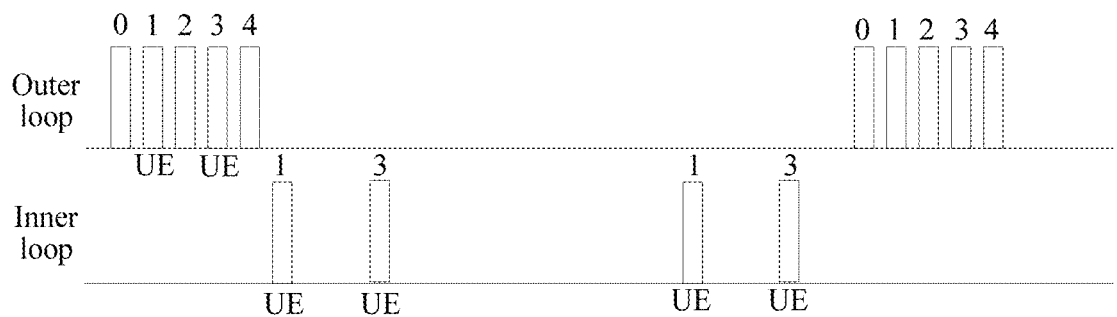
FIG. 1(b) is a schematic diagram of beamforming of two loops used by a base station according to an embodiment of the present application.

FIG. 1(b) is a schematic diagram of beamforming of two loops used by a base station according to an embodiment of the present application.

The base station may send a common signal by using a one-loop manner or a two-loop manner. In the one-loop manner: In one period, the base station successively sends beam information in different beam directions, so that beams may cover an entire sector, and UE receiving a beam feeds back beam identity information of the beam to the base station. In a next period, the base station and the UE separately perform the foregoing process again.

In the two-loop manner: In a loop 1 (outer loop), the base station sends beams according to the one-loop manner, and UE receiving a beam feeds back beam identity information of the beam to the base station. In a loop 2 (inner loop), the base station sends beams only to a beam location in which UE exists, and sends no beam in a direction in which no UE exists, to reduce interference to a neighboring cell and save energy.

Figure 2:
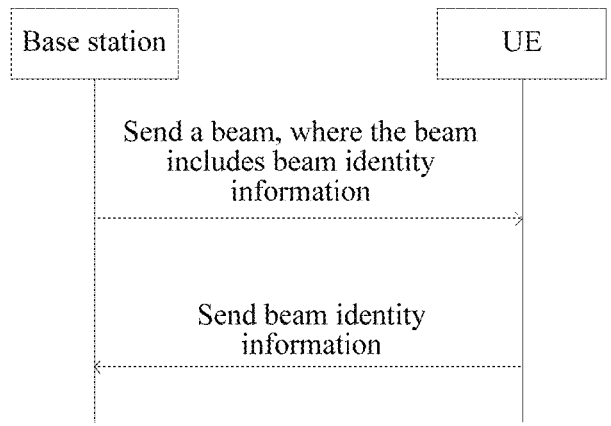
FIG. 2 is a schematic flowchart of a method for obtaining a location of UE according to an embodiment of the present application.

FIG. 2 is a flowchart of an embodiment of the present application. A method disclosed by FIG. 2 and a description of FIG. 2 may be based on FIG. 1(a) and FIG. 1(b), and the beamforming methods disclosed by FIG. 1(a) and FIG. 1(b) in the embodiments of the present application. As shown in FIG. 2, a base station sends at least one beam. Each beam includes first beam identity information, and the first beam identity information is used to uniquely identify the beam.

The base station may add the first beam identity information to the sent beam in a manner of scrambling a secondary synchronization channel (SSS, or a primary synchronization channel (PSS). In the existing LTE technology, there are 504 different physical layer cell identities, the identities are grouped into 168 groups, and each group has three identities. Three PSS sequences are used to represent cell identities $N_{ID}^{(2)}$ in a group, and 168 SSS sequences are used to represent a group identity $N_{ID}^{(1)}$, and $N_{ID}^{cell}=3N_{ID}^{(1)}+N_{ID}^{(2)}$. A PSS has a frequency domain ZC sequence having a length of 63 bits, and the three PSS sequences correspond to three physical layer identities of cells. An SSS sequence is formed by interleaving two M sequences having a length of 31 bits, and the two M sequences of SSC1 and SSC2 are generated by different cyclic shifts of a same M sequence having a length of 31 bits. The SSS sequence is scrambled by using a code related to the PSS. Based on the foregoing encoding manner, a new scrambling code sequence is multiplied, so that beam identity information is further represented based on a PCI, a scrambling code sequence may be encoded by using an M sequence and the like, and a specific encoding algorithm does not fall within the scope of the present application.

Alternatively, the base station may send the first beam identity information on a beam in an independent encoding manner, for example, represent the first beam identity information by setting a second secondary synchronization channel and using independent encoding. Alternatively, the base station may use a manner similar to the prior art in which different cells use different cell reference signals (CRS), and use different beam reference signals (BRS) on different beams. Alternatively, the base station adds the first beam identity information to a master information block (MIB) on a broadcast channel (BCH). A specific expression method of the first beam identity information is not limited in the present application.

UE that is in coverage of the beam receives the beam, and sends current second beam identity information to the base station. The second beam identity information corresponds to the first beam identity information, and the second beam identity information is used to indicate a beam on which the UE resides. The second beam identity information sent by the UE may be different from the first beam identity information sent by the base station. For example, the first beam identity information sent by the base station and the second beam identity information sent by the UE use different encoding manners. To improve reliability, the first beam identity information sent by the base station may use a more complicated encoding manner. There is a correspondence or a mapping relationship between the first beam identity information sent by the base station and the second beam identity information sent by the UE, and the mapping relationship may be a one-to-one mapping relationship or a multiple-to-one mapping relationship. For example, one piece of beam identity information sent by the UE may be an index of a group of beam identity information sent by the base station, to improve reliability. For example, in consideration of a beam detection error of the UE or higher possibility of receiving a beam of the base station, the UE feeds back one piece of beam index information and the base station receives the beam index information fed back by the UE. The beam index information may indicate that the UE may be in multiple beam directions. In this case, the base station subsequently sends beams in all the multiple beam directions, so that a possibility for the UE to receive the beam of the base station is improved. For another example, the base station sends multiple beams at a same moment or consecutive moments, the UE reports an optimal beam identity of the multiple beams or the UE reports multiple narrow beam identities, the base station uses one or more wide beam identities, and multiple narrow beam identities correspond to one wide beam identity. Alternatively, the mapping relationship may be a one-to-multiple mapping relationship. For example, also in consideration of beam reliability, the base station sends one piece of beam identity information, and the UE feeds back multiple pieces of beam identity information. The multiple pieces of beam identity information are sorted according to beam signal quality, and may be information about beams received by the UE at different moments. For the one-to-multiple or the multiple-to-one mapping manner, the mapping relationship between a beam identity sent by the base station and beam identity information fed back by the UE may be agreed upon in advance or pre-configured by the base station. Alternatively, the base station may pre-configure the foregoing multiple mapping relationships and indicate, by means of dynamic signaling, a mapping relationship to be used in a next phase, so that the base station and the UE may determine a beam location according to the mapping relationship. When the UE reports multiple pieces of beam information, the base station may determine that the UE may be on any one of the reported beams, or determine, according to a sequence agreed upon in advance, a beam on which the UE resides. For example, the base station determines that the UE resides on a beam corresponding to the first beam identity information, where the beam indicates an optimal beam measured by the UE.

The first beam identity information is a code of a beam identity or a beam identity. The second beam identity information corresponds to the code of the first beam identity or the beam identity.

Optionally, the UE sends the second beam identity information when a preset condition is satisfied. Specifically, the UE determines whether a preset reporting condition is satisfied. When the UE determines that the preset reporting condition is satisfied, the UE sends the second beam identity information.

The preset condition may be that when the UE moves and enters different beam coverage areas, the UE identifies that beam identity information changes by means of synchronization channel detection. When this condition is satisfied, the UE sends the second beam identity information, which includes beam identity information of a beam on which the UE resides after movement. The UE may identify whether the first beam identity information changes by using a method of detecting a synchronization channel, or reading a broadcast channel, or detecting a beam reference signal, where the synchronization channel, the broadcast channel, or the beam reference signal includes beam identity information. The beam identity information may be an index value or a precoding matrix index that represents a beam direction. The UE may send the second beam identity information to the base station in at least one of the following manners: for example, by using a physical uplink control channel (PUCCH), a physical uplink shared channel (PUSCH), a Media Access Control layer control element (MAC CE), or radio resource control (RRC) signaling.

Alternatively, the preset condition may be that when the UE needs to communicate data, the UE sends beam identity information. For example, when uplink data of the UE arrives, if the UE and the base station maintain uplink synchronization, the UE may directly send the second beam identity information. If the UE already loses uplink synchronization, the UE needs to report the beam identity information by means of a random access process, and adds the beam identity information to a random access message 3 and sends the random access message 3.

Alternatively, the preset condition may be that when migrating from a discontinuous reception (DRX) inactive state (inactive time) to an active state (active time), the UE reports the second beam identity information;

when migrating from a deactivated state to an activated state in a millimetric wave secondary cell, the UE reports the second beam identity information; or when receiving a paging paging message of the base station, the UE sends the second beam identity information.

Optionally, the base station sends a request message to the UE, where the request message is used to instruct the UE to send the second beam identity information. After receiving the request message, the UE sends the second beam identity information to the base station. The base station requests, by using a physical downlink control channel (PDCCH) or a Media Access Control layer control element MAC CE, the UE to report the second beam identity information. The UE adds the beam identity information to the Media Access Control layer control element MAC CE according to the request of the base station, or the UE may carry the beam identity information by means of the PUCCH, the PUSCH, or the RRC signaling.

The base station may further send configuration information to the UE, and the configuration information includes at least one of period information, event trigger information, or a reporting manner. The period information is used to instruct the UE to periodically report the second beam identity information. The event trigger information is used to instruct the UE to send the second beam identity information when the UE detects that first beam identity information is different from first beam identity information detected earlier, or when the UE receives the request message of the base station, or when uplink data arrives at the UE, or the like. According to the reporting manner, the second beam identity information may be sent by means of the PUCCH, the PUSCH, the MAC CE, or the RRC signaling.

The base station receives the second beam identity information sent by the UE, where the second beam identity information corresponds to the first beam identity information, and the second beam identity information is used to indicate a beam on which the UE resides.

The base station determines a current location of the UE according to the current identity information sent by the UE. That is, the base station may obtain the beam on which the UE resides and further obtain the current location of the UE according to the received current identity information of the UE.

In this embodiment of the present application, beamforming is performed on a common signal. A beam identity is scrambled by using a synchronization channel, or a beam identity is carried by using a separate beam identity channel or a broadcast channel, or a beam identity is represented by using a beam reference signal, or a beam identity is represented by using a precoding matrix. In this way, UE can detect beam information, and the UE can report beam identity information in real time or report beam identity information as required. Therefore, the base station can trace a beam location in which the UE is located, and the base station obtains beam location information of the UE for a subsequent communication process, thereby resolving a coverage problem of a common channel.

Figure 3:
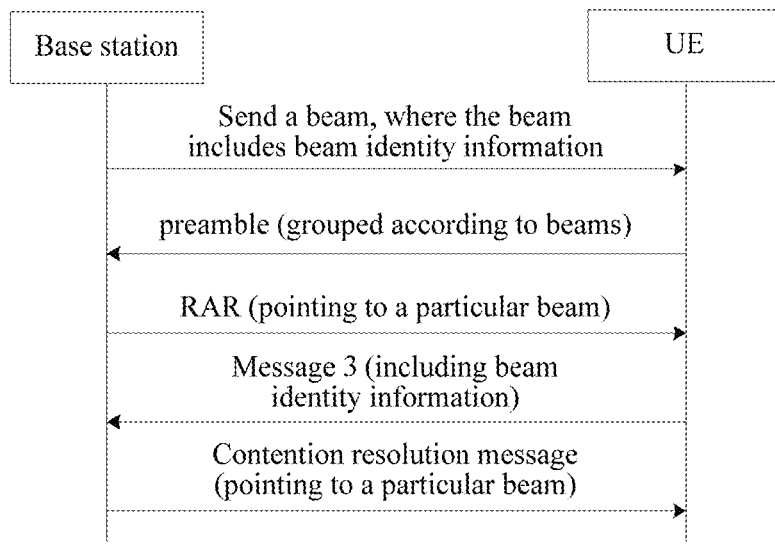
FIG. 3 is another schematic flowchart of a method for obtaining a location of UE according to an embodiment of the present application.

FIG. 3 is another flowchart of an embodiment of the present application. A method disclosed by FIG. 3 and a description of FIG. 3 may be based on FIG. 1(a), FIG. 1(b), and FIG. 2, and the methods disclosed by FIG. 1(a), FIG. 1(b), and FIG. 2 in the embodiments of the present application. As shown in FIG. 3, a base station sends at least one beam, where each beam includes first beam identity information, and the first beam identity information is used to uniquely identify the beam. After receiving the beam, UE sends a random access preamble to the base station.

Optionally, if the random access preamble or a time-frequency domain resource of a random access channel corresponds to the beam, the time-frequency domain resource of the random access channel is used by the UE to send a preamble. For example, a preamble corresponds to the beam. The UE sends the corresponding random access preamble according to a correspondence between the random access preamble and the beam. Details are as follows:

The UE identifies the first beam identity information by means of synchronization channel detection.

The UE receives a system message and obtains physical random access channel (PRACH) resource configuration information. The physical random access channel resource configuration information includes random access preamble configuration information, and the random access preamble configuration information is grouped according to a beam identity, that is, the beam corresponds to the random access preamble. It should be noted that the UE may receive the system message before receiving the beam or after receiving the beam, that is, the UE needs to obtain the system message before the UE needs to use the correspondence between the beam and the random access preamble.

The UE selects a corresponding random access preamble according to a beam on which the UE currently resides and sends the corresponding random access preamble to the base station, so that the base station determines a location of the UE according to the received random access preamble. The base station sends a random access response (RAR) message in a direction of the location of the UE, and the base station may add first beam identity information to the RAR. After receiving the RAR message, the UE sends a random access message 3 to the base station, the random access message 3 may include second beam identity information, and the second beam identity information in the random access message 3 may be different from the random access preamble, a random access preamble of the RAR, or corresponding second beam identity information in the RAR. For example, the UE moves to another beam in the random access process. A form of the second beam identity information may be a Media Access Control layer control element MAC CE, and the random access message 3 may further include UE identity information, such as S-TMSI.

After receiving the random access message 3, the base station sends a contention resolution message by using a beam, and the beam points to a beam location corresponding to the second beam identity information added by the UE to the random access message 3. If the UE does not add new first beam identity information to the random access message 3, the beam of the contention resolution message points to the random access preamble, first beam identity information corresponding to the random access preamble of the RAR, or a beam location corresponding to the first beam identity information in the RAR.

The UE sends the second beam identity information to the base station. Optionally, the UE sends the second beam identity information when a preset condition is satisfied. Specifically, the UE determines whether a preset reporting condition is satisfied. When the UE determines that the preset reporting condition is satisfied, the UE sends the second beam identity information.

The preset condition may be that when the UE moves and enters different beam coverage areas, the UE identifies, by means of synchronization channel detection, that beam identity information changes. When this condition is satisfied, the UE sends the second beam identity information, which includes beam identity information of a beam on which the UE resides after movement. The UE may send the second beam identity information to the base station in at least one of the following manners, for example, by means of a physical uplink control channel (PUCCH), a PUSCH, a MAC CE, or RRC signaling.

Alternatively, the preset condition may be that when the UE needs to communicate data, the UE sends second wave identity information. For example, when uplink data of the UE arrives, if the UE and the base station maintain uplink synchronization, the UE may directly send the second beam identity information. If the UE already loses uplink synchronization, the UE needs to report the beam identity information by means of a random access process, and adds the second beam identity information to the random access message 3 and sends the random access message 3.

Alternatively, the preset condition may be that when migrating from a discontinuous reception DRX inactive state (inactive time) to an active state (active time), the UE reports the second beam identity information;

when migrating from a deactivated state to an activated state in a millimetric wave secondary cell, the UE reports the second beam identity information; or when receiving a paging paging message of the base station, the UE sends the second beam identity information.

Optionally, the base station sends a request message to the UE, where the request message is used to instruct the UE to send the second beam identity information. After receiving the request message, the UE sends the second beam identity information to the base station.

The base station receives the second beam identity information sent by the UE, where the second beam identity information corresponds to the first beam identity information, and the second beam identity information is used to indicate a beam on which the UE resides.

The base station determines a current location of the UE according to the second identity information sent by the UE. That is, the base station may obtain the beam on which the UE resides and further obtain the current location of the UE according to the received current identity information of the UE.

The first beam identity information or the second beam identity information in the foregoing steps may be an index value or a precoding matrix index (PMI) that represents a beam direction. This embodiment is mainly applied to a beamforming manner of beam switching, and may also be applied to a manner of adaptive beamforming. Alternatively, a beam identity may be used as a scrambling code and scrambled on a synchronization signal such as a primary synchronization signal or a secondary synchronization signal, a reference signal representing a beam identity, a physical channel that is separately encoded and that represents a beam identity, a broadcast channel on which a beam identity is sent, or an index value or a precoding matrix index that represents a beam direction. In this embodiment of the present application, beamforming is performed on a common signal. In a method such as a beam identity is scrambled by using a synchronization channel, UE detects beam information most rapidly, and beam identity information detected by the UE is reported in a random access process, so that a base station obtains beam location information of the UE. The UE can report the beam identity information in real time or report the beam identity information as required, so that the base station can trace a beam location in which the UE is located, and use the beam location in a subsequent communication process, thereby resolving a coverage problem of a common channel.

Figure 4:
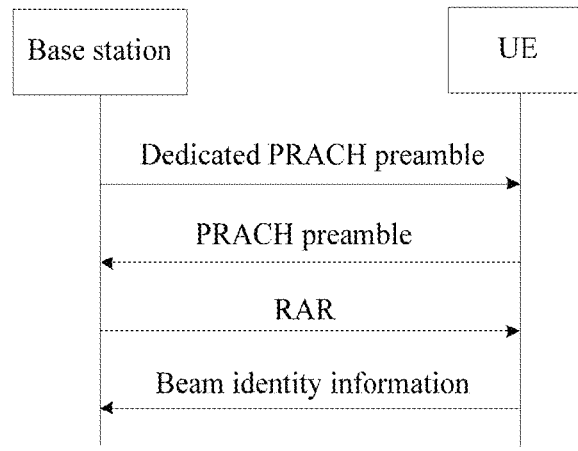
FIG. 4 is still another schematic flowchart of a method for obtaining a location of UE according to an embodiment of the present application.

FIG. 4 is a flowchart of another embodiment of the present application. A method disclosed by FIG. 4 and a description of FIG. 4 may be based on FIG. 1(a), FIG. 1(b), FIG. 2, and FIG. 3, and the methods disclosed by FIG. 1(a), FIG. 1(b), FIG. 2, and FIG. 3 in the embodiments of the present application. Details are shown in FIG. 4.

A base station sends at least one beam, where each beam includes first beam identity information, and the first beam identity information is used to uniquely identify the beam.

The base station sends a dedicated random access preamble PRACH random access preamble to multiple beam locations and specifies a random access resource, and the random access resource includes a time-frequency domain resource.

It should be noted that the PRACH random access preamble and the specified random access resource may be added together with the first beam identity information to a same beam and sent to UE simultaneously.

The UE sends the random access preamble to the base station by using the dedicated random access preamble and the random access resource specified by the base station.

The base station determines a beam location of the UE according to a direction of arrival (DOA) of a beam and/or an angle of arrival (AOA) of a beam of the random access preamble by using the prior art, and sends an RAR to one or more beam directions.

The UE receives the RAR and completes a random access process.

Optionally, the UE sends the second beam identity information when a preset condition is satisfied. Specifically, the UE determines whether a preset reporting condition is satisfied. When the UE determines that the preset reporting condition is satisfied, the UE sends the second beam identity information.

The preset condition may be that when the UE moves and enters different beam coverage areas, the UE identifies, by means of synchronization channel detection, that beam identity information changes. When this condition is satisfied, the UE actively sends the second beam identity information, which includes beam identity information of a beam on which the UE resides after movement. The UE may send the second beam identity information to the base station in at least one of the following manners, for example, by means of a physical uplink control channel (PUCCH), a PUSCH, a MAC CE, or RRC signaling.

Alternatively, the preset condition may be that when the UE needs to communicate data, the UE sends wave identity information. For example, when uplink data of the UE arrives, if the UE and the base station maintain uplink synchronization, the UE may directly send the second beam identity information. If the UE already loses uplink synchronization, the UE needs to report the beam identity information by means of a random access process, and adds the second beam identity information to a random access message 3 and sends the random access message 3.

Alternatively, the preset condition may be that when migrating from a discontinuous reception DRX inactive state (inactive time) to an active state (active time), the UE reports the second beam identity information;

when migrating from a deactivated state to an activated state in a millimetric wave secondary cell, the UE reports the second beam identity information; or when receiving a paging paging message of the base station, the UE sends the second beam identity information.

Optionally, the base station sends a request message to the UE, where the request message is used to instruct the UE to send the second beam identity information. After receiving the request message, the UE sends the second beam identity information to the base station.

The base station receives the second beam identity information sent by the UE, where the second beam identity information corresponds to the first beam identity information, and the second beam identity information is used to indicate a beam on which the UE resides.

The base station determines a current location of the UE according to the current identity information sent by the UE. That is, the base station may obtain the beam on which the UE resides and further obtain the current location of the UE according to the received current identity information of the UE.

In this embodiment of the present application, beamforming is performed on a common signal. In a method of scrambling a beam identity by using a synchronization channel, UE detects beam information most rapidly, and beam identity information detected by the UE is reported in a random access process, so that a base station obtains beam location information of the UE. The UE can report the beam identity information in real time or report the beam identity information as required, so that the base station can trace a beam location in which the UE is located, and use the beam location in a subsequent communication process, thereby resolving a coverage problem of a common channel.

Figure 5:
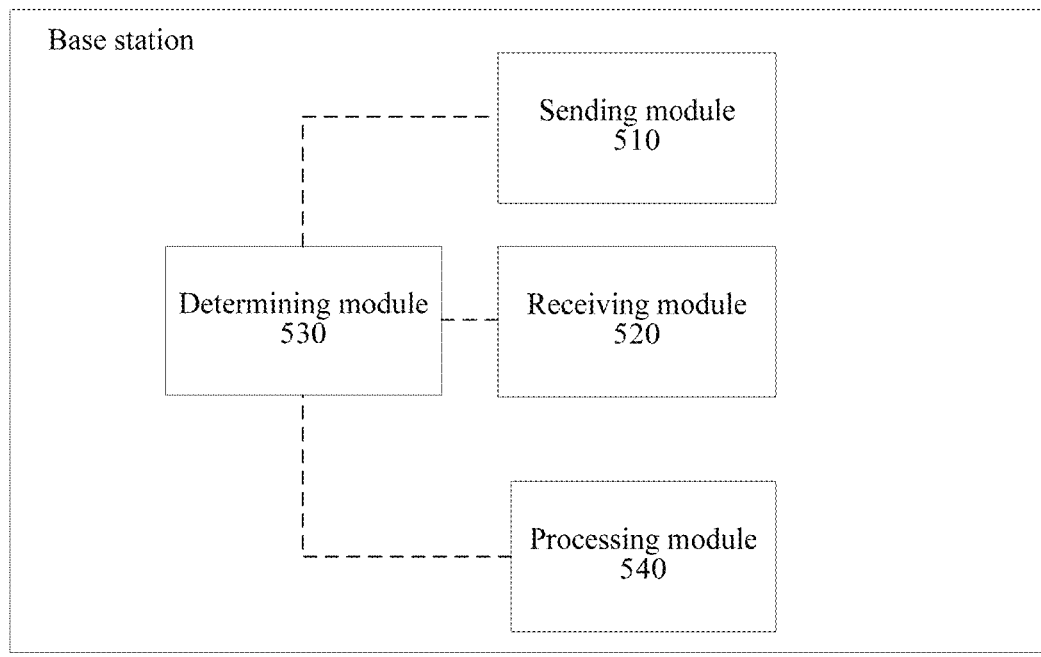
FIG. 5 is a schematic block diagram of a base station according to an embodiment of the present application.

FIG. 5 is a schematic diagram of a base station according to an embodiment of the present application. The base station disclosed by FIG. 5 and a description of FIG. 5 may be implemented based on FIG. 1(*a*) and FIG. 1(*b*) to FIG. 4, and the methods disclosed by FIG. 1(*a*) and FIG. 1(*b*) to FIG. 4 in the embodiments of the present application. The base station includes:

a sending module 510, where the sending module 510 is configured to send at least one beam, where each beam includes first beam identity information, the first beam identity information is used to uniquely identify the beam, and the beam is received by UE that is in coverage of the beam;

a receiving module 520, where the receiving module 520 is configured to receive second beam identity information sent by the UE, where the second beam identity information corresponds to the first beam identity information, and the second beam identity information is used to indicate a beam on which the UE resides; and a determining module 530, where the determining module 530 is configured to determine a current location of the UE according to the current beam identity information sent by the UE.

Further, the base station may further include a processing module 540. The processing module 540 is configured to process each beam, so that each beam includes the first beam identity information. The first beam identity information is used to uniquely identify the beam.

Specifically, the sending module 510 sends at least one beam, where each beam includes the first beam identity information, and the first beam identity information is used to uniquely identify the beam.

The processing module 540 may add the first beam identity information to the sent beam in a manner of scrambling a secondary synchronization signal.

UE that is in coverage of the beam receives the beam, and sends the second beam identity information to the base station. The second beam identity information corresponds to the first beam identity information, and the second beam identity information is used to indicate a beam on which the UE resides.

Optionally, the sending module 510 is further configured to send a request message to the UE, where the request message is used to instruct the UE to send the second beam identity information. After receiving the request message, the UE sends the second beam identity information to the base station.

The receiving module 520 is further configured to receive second beam identity information sent by the UE, where the second beam identity information corresponds to the first beam identity information, and the second beam identity information is used to indicate a beam on which the UE resides.

The determining module 530 is configured to determine a current location of the UE according to the second beam identity information sent by the UE. That is, the base station may obtain the beam on which the UE resides and further obtain the current location of the UE according to the received current identity information of the UE.

In this embodiment of the present application, beamforming is performed on a common signal. In a method of scrambling a beam identity by using a synchronization channel, UE detects beam information most rapidly, and the UE can report beam identity information in real time or report beam identity information as required, so that the base station can trace a beam location in which the UE is located, and use the beam location in a subsequent communication process, thereby resolving a coverage problem of a common channel.

Described below is another embodiment of the base station disclosed by the present application. The base station disclosed in this embodiment may be based on FIG. 1(*a*) and FIG. 1(*b*) to FIG. 5, and the methods or the apparatus disclosed by FIG. 1(*a*) and FIG. 1(*b*) to FIG. 5 in the embodiments of the present application. In this embodiment, the sending module 510 of the base station sends at least one beam, where each beam includes first beam identity information, and the first beam identity information is used to uniquely identify the beam. After receiving the beam, UE sends a random access preamble to the base station.

Optionally, if the random access preamble or a time-frequency domain resource of a random access channel corresponds to the beam, the time-frequency domain resource of the random access channel is used by the UE to send a preamble. For example, a preamble corresponds to the beam. The UE sends the corresponding random access preamble according to a correspondence between the random access preamble and the beam.

The UE selects a corresponding random access preamble according to a beam on which the UE currently resides, to initiate a random access process. The determining module 530 of the base station is further configured to determine a location of the UE according to a received random access preamble. The sending module 510 is further configured to send a random access response (RAR) message in a direction of the location of the UE. After receiving the RAR message, the UE sends a random access message 3 to the base station. The random access message 3 may include second beam identity information, and the second beam identity information to the random access message 3 may be different with the random access preamble or corresponding beam identity information in the RAR. For example, the UE moves to another beam in the random access process. A form of the beam identity information may be a Media Access Control layer control element MAC CE, and the random access message 3 may further include UE identity information, such as S-TMSI.

After the receiving module 520 of the base station receives the random access message 3, the sending module 510 sends a contention resolution message by using a beam, and the beam points to a beam location corresponding to the beam identity information added by the UE to the random access message 3. If the UE does not add new beam identity information to the random access message 3, the beam of the contention resolution message points to the random access preamble or a beam location corresponding to the beam identity information in the RAR.

Optionally, the sending module 510 of the base station is further configured to send a request message to the UE, where the request message is used to instruct the UE to send the second beam identity information. After receiving the request message, the UE sends the second beam identity information to the base station.

The receiving module 520 receives the second beam identity information sent by the UE, where the second beam identity information corresponds to the first beam identity information, and the second beam identity information is used to indicate a beam on which the UE resides.

The determining module 530 of the base station determines a current location of the UE according to the second beam identity information sent by the UE. That is, the base station may obtain the beam on which the UE resides and further obtain the current location of the UE according to the received current identity information of the UE.

The first beam identity information or the second beam identity information in the foregoing steps may be an index value or a precoding matrix index (PMI) that represents a beam direction. This embodiment is mainly applied to a beamforming manner of beam switching, and may also be applied to a manner of adaptive beamforming. Alternatively, a beam identity may be used as a scrambling code and scrambled on a synchronization signal such as a primary synchronization signal or a secondary synchronization signal, a reference signal representing a beam identity, a physical channel that is separately encoded and that represents a beam identity, a broadcast channel on which a beam identity is sent, or an index value or a precoding matrix index that represents a beam direction. In this embodiment of the present application, beamforming is performed on a common signal. In a method of scrambling a beam identity by using a synchronization channel, UE detects beam information most rapidly, and beam identity information detected by the UE is reported in a random access process, so that a base station obtains beam location information of the UE. The UE can report the beam identity information in real time or report the beam identity information as required, so that the base station can trace a beam location in which the UE is located, and use the beam location in a subsequent communication process, thereby resolving a coverage problem of a common channel.

Described below is still another embodiment of the base station disclosed by the present application. The base station disclosed in this embodiment may be based on FIG. 1(a) and FIG. 1(b) to FIG. 5, and the methods or the apparatuses disclosed by FIG. 1(a) and FIG. 1(b) to FIG. 5 in the embodiments of the present application. In this embodiment, the sending module 510 of the base station sends at least one beam, where each beam includes first beam identity information, and the first beam identity information is used to uniquely identify the beam.

The sending module 510 sends a dedicated random access preamble PRACH random access preamble to multiple beam locations and specifies a random access resource, and the random access resource includes a time-frequency domain resource.

It should be noted that the PRACH random access preamble and the specified random access resource may be added together with the first beam identity information to a same beam and sent to UE simultaneously.

The UE sends the random access preamble to the receiving module 520 of the base station by using the dedicated random access preamble and the random access resource specified by the base station.

The determining module 530 is further configured to determine a beam location of the UE according to a direction of arrival (DOA) of a beam and/or an angle of arrival (AOA) of a beam of the random access preamble received by the receiving module 520. The sending module 510 is further configured to send an RAR to one or more beam directions according to the beam location of the UE determined by the determining module 530.

The UE receives the RAR and completes a random access process.

Optionally, the sending module 510 is further configured to send a request message to the UE, where the request message is used to instruct the UE to send the second beam identity information. After receiving the request message, the UE sends the second beam identity information to the base station.

The receiving module 520 receives the second beam identity information sent by the UE, where the second beam identity information corresponds to the first beam identity information, and the second beam identity information is used to indicate a beam on which the UE resides.

The determining module 530 determines a current location of the UE according to the current identity information sent by the UE. That is, the base station may obtain the beam on which the UE resides and further obtain the current location of the UE according to the received current identity information of the UE.

In this embodiment of the present application, beamforming is performed on a common signal. In a method of scrambling a beam identity by using a synchronization channel, UE detects beam information most rapidly, and beam identity information detected by the UE is reported in a random access process, so that a base station obtains beam location information of the UE. The UE can report the beam identity information in real time or report the beam identity information as required, so that the base station can trace a beam location in which the UE is located, and use the beam location in a subsequent communication process, thereby resolving a coverage problem of a common channel.

Figure 6:
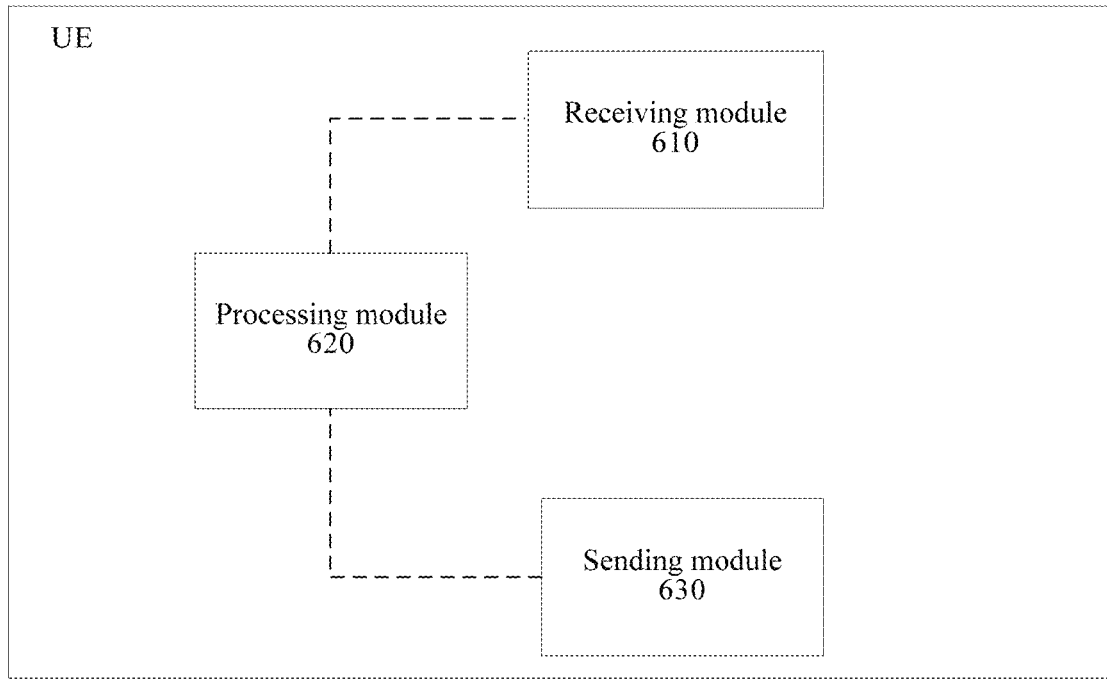
FIG. 6 is a schematic block diagram of UE according to an embodiment of the present application.

FIG. 6 shows UE according to an embodiment of the present application. The UE disclosed by FIG. 6 and a description of FIG. 6 may be implemented based on FIG. 1(a) and FIG. 1(b) to FIG. 4, and the methods disclosed by FIG. 1(a) and FIG. 1(b) to FIG. 4 in the embodiments of the present application. As shown in FIG. 6, the UE includes:

a receiving module 610, where the receiving module 610 is configured to receive a beam sent by a base station, where the beam includes first beam identity information, and the first beam identity information is used to uniquely identify the beam;

a processing module 620, where the processing module 620 is configured to generate second beam identity information, where the second beam identity information corresponds to the first beam identity information, and the second beam identity information is used to indicate a beam on which the UE resides; and a sending module 630, where the sending module 630 is configured to send the second beam identity information to the base station, so that the base station determines a current location of the UE according to the second beam identity information.

The receiving module 610 is configured to receive a beam sent by a base station, where the base station sends at least one beam, each beam includes first beam identity information, and the first beam identity information is used to uniquely identify the beam.

The base station may add the first beam identity information to the sent beam in a manner of scrambling a secondary synchronization signal.

The beam is received by the receiving module 610 of the UE that is in coverage of the beam, the sending module 630 of the UE sends the second beam identity information to the base station, the second beam identity information corresponds to the first beam identity information, and the second beam identity information is used to indicate a beam on which the UE resides.

Optionally, the sending module 630 of the UE sends the second beam identity information when a preset condition is satisfied. Specifically, the processing module 620 of the UE determines whether a preset reporting condition is satisfied. When the processing module 620 determines that the preset reporting condition is satisfied, the UE sends the second beam identity information.

The preset condition may be that when the UE moves and enters different beam coverage areas, the UE identifies that beam identity information changes. When this condition is satisfied, the sending module 630 sends the second beam identity information, which includes beam identity information of a beam on which the UE resides after movement. The UE may identify, by means of synchronization channel detection, whether the first beam identity information changes. That is, the UE receives a broadcast channel message by using a broadcast channel, and the broadcast channel message includes a beam identity. The UE may send the second beam identity information to the base station in at least one of the following manners, for example, by means of a physical uplink control channel PUCCH, a PUSCH, a MAC CE, or RRC signaling.

Alternatively, the preset condition may be that when the UE needs to communicate data, the sending module 630 sends wave identity information. For example, when uplink data of the UE arrives, if the UE and the base station maintain uplink synchronization, the sending module 630 may send the second beam identity information. If the UE already loses uplink synchronization, the UE needs to report the second beam identity information by means of a random access process, and adds the second beam identity information to a random access message 3 and sends the random access message 3.

Alternatively, the preset condition may be that when migrating from a discontinuous reception DRX inactive state to an active state, the UE reports the second beam identity information;

when migrating from a deactivated state to an activated state in a millimetric wave secondary cell, the UE reports the second beam identity information; or when receiving a paging paging message of the base station, the UE sends the second beam identity information.

Optionally, the base station sends a request message to the UE, where the request message is used to instruct the UE to send the second beam identity information. After the receiving module 610 of the UE receives the request message, the sending module 630 sends the second beam identity information to the base station.

The base station receives the second beam identity information sent by the UE, where the second beam identity information corresponds to the first beam identity information, and the second beam identity information is used to indicate a beam on which the UE resides.

The base station determines a current location of the UE according to the current identity information sent by the UE. That is, the base station may obtain the beam on which the UE resides and further obtain the current location of the UE according to the received current identity information of the UE.

In this embodiment of the present application, beamforming is performed on a common signal. In a method of scrambling a beam identity by using a synchronization channel, UE detects beam information most rapidly, and the UE can report beam identity information in real time or report beam identity information as required, so that the base station can trace a beam location in which the UE is located, and use the beam location in a subsequent communication process, thereby resolving a coverage problem of a common channel.

In another embodiment of the present application, a base station sends at least one beam, where each beam includes first beam identity information, and the first beam identity information is used to uniquely identify the beam. After the receiving module 610 of the UE receives the beam, the sending module 630 sends a random access preamble to the base station.

Optionally, if the random access preamble or a time-frequency domain resource of a random access channel corresponds to the beam, the time-frequency domain resource of the random access channel is used by the UE to send a preamble. For example, a preamble corresponds to the beam. The processing module 620 of the UE is configured to command the sending module 630 to send the corresponding random access preamble according to a correspondence between the random access preamble and the beam. Details are as follows:

The UE identifies the first beam identity information by means of synchronization channel detection.

The receiving module 610 of the UE receives a system message and obtains physical random access channel (PRACH) resource configuration information. The physical random access channel resource configuration information includes random access preamble configuration information, and the random access preamble information is grouped according to a beam identity, that is, the beam corresponds to the random access preamble. It should be noted that the UE may receive the system message before receiving the beam or after receiving the beam, that is, the UE needs to obtain the system message before the UE needs to use the correspondence between the beam and the random access preamble.

The processing module 620 selects a corresponding random access preamble according to a beam on which the UE currently resides, to initiate a random access process, so that the base station determines a location of the UE according to a received random access preamble. The base station sends a random access response (RAR) message in a direction of the location of the UE, and the base station may include the first beam identity information. After the receiving module 610 of the UE receives the RAR message, the sending module 630 sends a random access message 3 to the base station, the random access message 3 may include second beam identity information, and the beam identity information in the random access message 3 may be different from the random access preamble or corresponding beam identity information in the RAR. For example, the UE moves to another beam in the random access process. A form of the beam identity information may be a Media Access Control layer control element MAC CE, and the random access message 3 may further include UE identity information, such as S-TMSI.

After receiving the random access message 3, the base station sends a contention resolution message by using a beam, and the beam points to a beam location corresponding to the beam identity information added by the UE to the random access message 3. If the UE does not add new beam identity information to the random access message 3, the beam of the contention resolution message points to the random access preamble or a beam location corresponding to the beam identity information in the RAR.

The UE sends the second beam identity information to the base station by using the sending module 630. Optionally, the UE sends the second beam identity information when a preset condition is satisfied. Specifically, the processing module 630 of the UE determines whether a preset reporting condition is satisfied. When the processing module 620 determines that the preset reporting condition is satisfied, the UE sends the second beam identity information.

The preset condition may be that when the UE moves and enters different beam coverage areas, the UE identifies, by means of synchronization channel detection, that beam identity information changes. When this condition is satisfied, the UE sends the second beam identity information, which includes beam identity information of a beam on which the UE resides after movement. The UE may send the second beam identity information to the base station in at least one of the following manners, for example, by means of a physical uplink control channel PUCCH, a PUSCH, a MAC CE, or RRC signaling.

Alternatively, the preset condition may be that when the UE needs to communicate data, the UE sends wave identity information. For example, when uplink data of the UE arrives, if the UE and the base station maintain uplink synchronization, the UE may directly send the second beam identity information. If the UE already loses uplink synchronization, the UE needs to report the second beam identity information by means of a random access process, and adds the second beam identity information to a random access message 3 and sends the random access message 3.

Alternatively, the preset condition may be that when migrating from a discontinuous reception DRX inactive state to an active state, the UE reports the second beam identity information;

when migrating from a deactivated state to an activated state in a millimetric wave secondary cell, the UE reports the second beam identity information; or when receiving a paging paging message of the base station, the UE sends the second beam identity information.

Optionally, the base station sends a request message to the UE, where the request message is used to instruct the UE to send the second beam identity information. After receiving the request message, the UE sends the second beam identity information to the base station.

The base station receives the second beam identity information sent by the sending module 630 of the UE, where the second beam identity information corresponds to the first beam identity information, and the second beam identity information is used to indicate a beam on which the UE resides.

The base station determines a current location of the UE according to the current identity information sent by the sending module 630. That is, the base station may obtain the beam on which the UE resides and further obtain the current location of the UE according to the received current identity information of the UE.

In another embodiment of the present application, a base station sends at least one beam, where each beam includes first beam identity, and the first beam identity is used to uniquely identify the beam.

The base station sends a dedicated random access preamble PRACH random access preamble to multiple beam locations and specifies a random access resource, and the random access resource includes a time-frequency domain resource.

The sending module 630 of the UE sends the random access preamble to the base station by using the dedicated random access preamble and the random access resource specified by the base station.

The base station determines a beam location of the UE according to a direction of arrival (DOA) of a beam and/or an angle of arrival (AOA) of a beam of the random access preamble, and sends an RAR to one or more beam directions.

The UE receives the RAR and completes a random access process.

Optionally, the UE sends the second beam identity information when a preset condition is satisfied. Specifically, the UE determines whether a preset reporting condition is satisfied. When the UE determines that the preset reporting condition is satisfied, the UE sends the second beam identity information.

The preset condition may be that when the UE moves and enters different beam coverage areas, the UE identifies, by means of synchronization channel detection, that beam identity information changes. When this condition is satisfied, the UE actively sends the second beam identity information of the beam, which includes beam identity information of a beam on which the UE resides after movement. The UE may send the second beam identity information to the base station in at least one of the following manners, for example, by means of a physical uplink control channel PUCCH, a PUSCH, a MAC CE, or RRC signaling.

Alternatively, the preset condition may be that when the UE needs to communicate data, the UE sends wave identity information. For example, when uplink data of the UE arrives, if the UE and the base station maintain uplink synchronization, the UE may directly send the second beam identity information. If the UE already loses uplink synchronization, the UE needs to report the second beam identity information by means of a random access process, and adds the second beam identity information to a random access message 3 and sends the random access message 3.

Alternatively, the preset condition may be that when migrating from a discontinuous reception DRX inactive state to an active state, the UE reports the second beam identity information;

when migrating from a deactivated state to an activated state in a millimetric wave secondary cell, the UE reports the second beam identity information; or when receiving a paging paging message of the base station, the UE sends the second beam identity information.

Optionally, the base station sends a request message to the UE, where the request message is used to instruct the UE to send the second beam identity information. After the UE receives the request message, the sending module 630 sends the second beam identity information to the base station.

The base station receives the second beam identity information sent by the UE, where the second beam identity information corresponds to the first beam identity information, and the second beam identity information is used to indicate a beam on which the UE resides.

The base station determines a current location of the UE according to the current identity information sent by the UE. That is, the base station may obtain the beam on which the UE resides and further obtain the current location of the UE according to the received current identity information of the UE.

The UE in this embodiment is implemented based on FIG. 1(*a*) and FIG. 1(*b*) to FIG. 4 of the embodiments of the present application, and the methods disclosed by FIG. 1(*a*) and FIG. 1(*b*) to FIG. 4.

In this embodiment of the present application, beamforming is performed on a common signal. In a method of scrambling a beam identity by using a synchronization channel, UE detects beam information most rapidly, and beam identity information detected by the UE is reported in a random access process, so that a base station obtains beam location information of the UE. The UE can report the beam identity information in real time or report the beam identity information as required, so that the base station can trace a beam location in which the UE is located, and use the beam location in a subsequent communication process, thereby resolving a coverage problem of a common channel.

Figure 7:
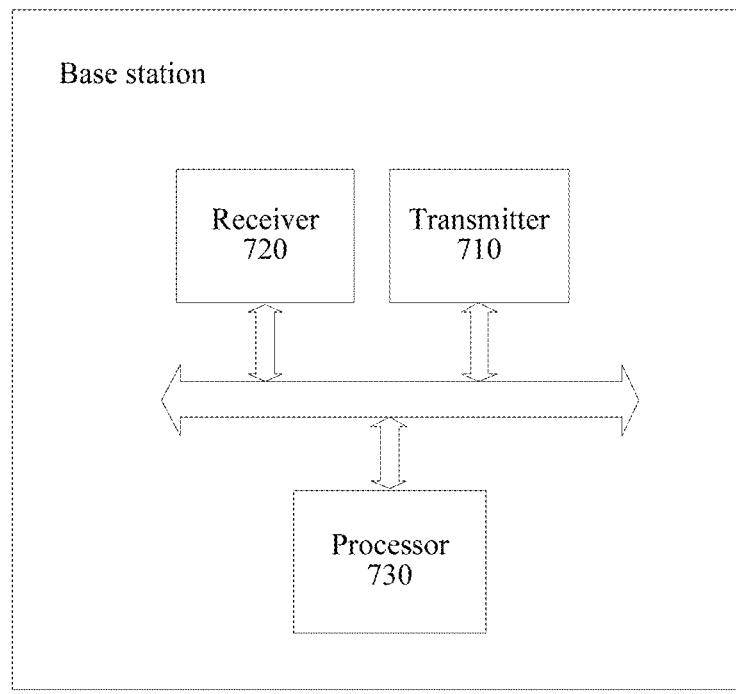
FIG. 7 is a schematic block diagram of a base station according to another embodiment of the present application.

FIG. 7 is a schematic diagram of a base station according to an embodiment of the present application. The base station disclosed by FIG. 7 and a description of FIG. 7 may be implemented based on FIG. 1(a) and FIG. 1(b) to FIG. 4, and the methods disclosed by FIG. 1(a) and FIG. 1(b) to FIG. 4 in the embodiments of the present application. The base station includes:

a transmitter 710, where the transmitter 710 is configured to send at least one beam, where each beam includes first beam identity information, the first beam identity information is used to uniquely identify the beam, and the beam is received by UE that is in coverage of the beam;

a receiver 720, where the receiver 720 is configured to receive second beam identity information sent by the UE, where the second beam identity information corresponds to the first beam identity information, and the second beam identity information is used to indicate a beam on which the UE resides; and a processor 730, where the processor 730 is configured to determine a current location of the UE according to the current beam identity information sent by the UE.

Further, the processor 730 is further configured to process each beam, so that each beam includes the first beam identity information, and the first beam identity information is used to uniquely identify the beam.

Specifically, the transmitter 710 sends at least one beam, where each beam includes first beam identity information, and the first beam identity information is used to uniquely identify the beam.

The processor 730 may add the first beam identity information to the sent beam in a manner of scrambling a secondary synchronization signal. UE that is in coverage of the beam receives the beam, and sends the second beam identity information to the base station. The second beam identity information corresponds to the first beam identity information, and the second beam identity information is used to indicate a beam on which the UE resides.

Optionally, the transmitter 710 is further configured to send a request message to the UE, where the request message is used to instruct the UE to send the beam identity information. After receiving the request message, the UE sends the second beam identity information to the base station.

The receiver 720 is further configured to receive second beam identity information sent by the UE, where the second beam identity information corresponds to the first beam identity information, and the second beam identity information is used to indicate a beam on which the UE resides.

The processor 730 is configured to determine a current location of the UE according to the current beam identity information sent by the UE. That is, the base station may obtain the beam on which the UE resides and further obtain the current location of the UE according to the received current identity information of the UE.

In this embodiment of the present application, beamforming is performed on a common signal. In a method of scrambling a beam identity by using a synchronization channel, UE detects beam information most rapidly, and the UE can report beam identity information in real time or report beam identity information as required, so that the base station can trace a beam location in which the UE is located, and use the beam location in a subsequent communication process, thereby resolving a coverage problem of a common channel.

Described below is another embodiment of the base station in the present application. The base station disclosed in this embodiment may be based on FIG. 1(a) and FIG. 1(b) to FIG. 4, and the methods disclosed by FIG. 1(a) and FIG. 1(b) to FIG. 4 in the embodiments of the present application. In this embodiment, the transmitter 710 of the base station sends at least one beam, where each beam includes a beam identity, and the first beam identity information is used to uniquely identify the beam. After receiving the beam, UE sends a random access preamble to the base station.

Optionally, if the random access preamble or a time-frequency domain resource of a random access channel corresponds to the beam, the time-frequency domain resource of the random access channel is used by the UE to send a preamble. For example, a preamble corresponds to the beam. The UE sends the corresponding random access preamble according to a correspondence between the random access preamble and the beam.

The UE selects a corresponding random access preamble according to a beam on which the UE currently resides, to initiate a random access process, so that the processor 730 of the base station determines a location of the UE according to a received random access preamble. The transmitter 710 is further configured to send a random access response (RAR) message in a direction of the location of the UE, and the random access message may include the first beam identity information. After receiving the RAR message, the UE sends a random access message 3 to the base station, the random access message 3 may include second beam identity information, and the second beam identity information in the random access message 3 may be different from the random access preamble or corresponding second beam identity information in the RAR. For example, the UE moves to another beam in the random access process. A form of the second beam identity information may be Media Access Control layer control element MAC CE, and the random access message 3 may further include UE identity information, such as S-TMSI.

After the receiver 720 of the base station receives the random access message 3, the transmitter 710 sends a contention resolution message by using a beam, and the beam points to a beam location corresponding to the beam identity information added by the UE to the random access message 3. If the UE does not add new beam identity information to the random access message 3, the beam of the contention resolution message points to the random access preamble or a beam location corresponding to the beam identity information in the RAR.

Optionally, the transmitter 710 of the base station is further configured to send a request message to the UE, where the request message is used to instruct the UE to send the second beam identity information. After receiving the request message, the UE sends the second beam identity information to the base station.

The receiver 720 receives the second beam identity information sent by the UE, where the second beam identity information corresponds to the first beam identity information, and the second beam identity information is used to indicate a beam on which the UE resides.

The processor 730 of the base station determines a current location of the UE according to the current identity information sent by the UE. That is, the base station may obtain the beam on which the UE resides and further obtain the current location of the UE according to the received current identity information of the UE.

The first beam identity information or the second beam identity information in the foregoing steps may be an index value or a precoding matrix index (PMI) that represents a beam direction. This embodiment is mainly applied to a beamforming manner of beam switching, and may also be applied to a manner of adaptive beamforming. Alternatively, a beam identity may be used as a scrambling code and scrambled on a synchronization signal such as a primary synchronization signal or a secondary synchronization signal, a reference signal representing a beam identity, a physical channel that is separately encoded and that represents a beam identity, a broadcast channel on which a beam identity is sent, an index value or a precoding matrix index that represents a beam direction. Described below is still another embodiment of the base station in the present application. The base station disclosed in this embodiment may be based on FIG. 1(a) and FIG. 1(b) to FIG. 4, and the methods disclosed by FIG. 1(a) and FIG. 1(b) to FIG. 4 in the embodiments of the present application. In this embodiment, the transmitter 710 of the base station sends at least one beam, where each beam includes first beam identity information, and the first beam identity information is used to uniquely identify the beam.

The transmitter 710 sends a dedicated random access preamble PRACH random access preamble to multiple beam locations and specifies a random access resource, and the random access resource includes a time-frequency domain resource.

It should be noted that the PRACH random access preamble and the specified random access resource may be added together with the first beam identity information to a same beam and sent to UE simultaneously.

The UE sends the random access preamble to the receiver 720 of the base station by using the dedicated random access preamble and the random access resource specified by the base station.

The processor 730 is further configured to determine a beam location of the UE according to a direction of arrival (DOA) of a beam and/or an angle of arrival (AOA) of a beam of the random access preamble received by the receiver 720. The transmitter 710 is further configured to send an RAR to one or more beam directions according to the beam location of the UE determined by the processor 730.

The UE receives the RAR and completes a random access process.

Optionally, the transmitter 710 is further configured to send a request message to the UE, where the request message is used to instruct the UE to send the second beam identity information. After receiving the request message, the UE sends the second beam identity information to the base station.

The receiver 720 receives the second beam identity information sent by the UE, where the second beam identity information corresponds to the first beam identity information, and the second beam identity information is used to indicate a beam on which the UE resides.

The processor 730 determines a current location of the UE according to the current beam identity information sent by the UE. That is, the base station may obtain the beam on which the UE resides and further obtain the current location of the UE according to the received current identity information of the UE.

In this embodiment of the present application, beamforming is performed on a common signal. In a method of scrambling a beam identity by using a synchronization channel, UE detects beam information most rapidly, and beam identity information detected by the UE is reported in a random access process, so that a base station obtains beam location information of the UE. The UE can report the beam identity information in real time or report the beam identity information as required, so that the base station can trace a beam location in which the UE is located, and use the beam location in a subsequent communication process, thereby resolving a coverage problem of a common channel.

Figure 8:
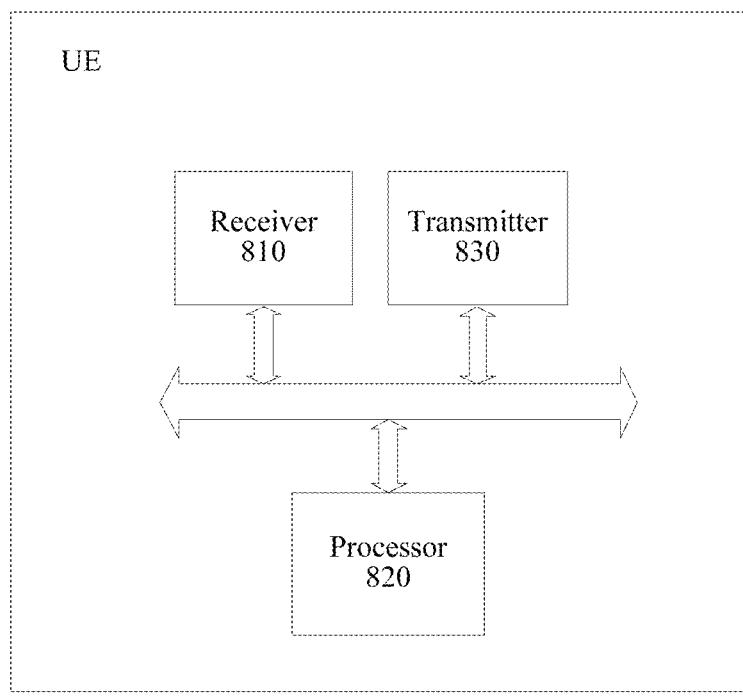
FIG. 8 is a schematic block diagram of UE according to another embodiment of the present application.

FIG. 8 is UE according to an embodiment of the present application. The UE disclosed by FIG. 8 and a description of FIG. 8 may be implemented based on FIG. 1(a) and FIG. 1(b) to FIG. 4, and the methods disclosed by FIG. 1(a) and FIG. 1(b) to FIG. 4 in the embodiments of the present application. As shown in FIG. 8, the UE includes:

a receiver 810, where the receiver 810 is configured to receive a beam sent by a base station, where the beam includes first beam identity information, and the first beam identity information is used to uniquely identify the beam;

a processor 820, where the processor 820 is configured to generate second beam identity information, where the second beam identity information corresponds to the first beam identity information, and the second beam identity information is used to indicate a beam on which the UE resides; and a transmitter 830, where the transmitter 830 is configured to send the second beam identity information to the base station, so that the base station determines a current location of the UE according to the current identity.

The receiver 810 is configured to receive a beam sent by a base station, where the base station sends at least one beam, each beam includes first beam identity information, and the first beam identity information is used to uniquely identify the beam.

The base station may add the first beam identity information to the sent beam in a manner of scrambling a secondary synchronization signal. The beam is received by a receiver 810 of UE in coverage of the beam, a transmitter 830 of the UE sends the second beam identity information to the base station, the second beam identity information corresponds to the first beam identity information, and the second beam identity information is used to indicate a beam on which the UE resides.

Optionally, the transmitter 830 of the UE sends the second beam identity information when a preset condition is satisfied. Specifically, the processor 820 of the UE determines whether a preset reporting condition is satisfied. When the processor 820 determines that the preset reporting condition is satisfied, the UE sends the second beam identity information.

The preset condition may be that when the UE moves and enters different beam coverage areas, the UE identifies that beam identity information changes. When this condition is satisfied, the transmitter 830 sends the second beam identity information, which includes beam identity information of a beam on which the UE resides after movement. The UE may identify, by means of synchronization channel detection, whether the first beam identity information changes. That is, the UE receives a broadcast channel message by using a broadcast channel, and the broadcast channel message includes a beam identity. The UE may send the second beam identity information to the base station in at least one of the following manners, for example, by means of a physical uplink control channel PUCCH, a PUSCH, a MAC CE, or RRC signaling.

Alternatively, the preset condition may be that when the UE needs to communicate data, the transmitter 830 sends wave identity information. For example, when uplink data of the UE arrives, if the UE and the base station maintain uplink synchronization, the transmitter 830 may send the second beam identity information. If the UE already loses uplink synchronization, the UE needs to report the second beam identity information by means of a random access process, and adds the second beam identity information to a random access message 3 and sends the random access message 3.

Alternatively, the preset condition may be that when migrating from a discontinuous reception DRX inactive state (inactive time) to an active state (active time), the UE reports the second beam identity information;

when migrating from a deactivated state to an activated state in a millimetric wave secondary cell, the UE reports the second beam identity information; or when receiving a paging paging message of the base station, the UE sends the second beam identity information.

Optionally, the base station sends a request message to the UE, where the request message is used to instruct the UE to send the second beam identity information. After the receiver 810 of the UE receives the request message, the transmitter 830 of the UE sends the second beam identity information to the base station.

The base station receives the second beam identity information sent by the UE, where the second beam identity information corresponds to the first beam identity information, and the second beam identity information is used to indicate a beam on which the UE resides.

The base station determines a current location of the UE according to the current identity information sent by the UE. That is, the base station may obtain the beam on which the UE resides and further obtain the current location of the UE according to the received current identity information of the UE.

In this embodiment of the present application, beamforming is performed on a common signal. In a method of scrambling a beam identity by using a synchronization channel, UE detects beam information most rapidly, and the UE can report beam identity information in real time or report beam identity information as required, so that the base station can trace a beam location in which the UE is located, and use the beam location in a subsequent communication process, thereby resolving a coverage problem of a common channel.

In another embodiment of the present application, a base station sends at least one beam, where each beam includes first beam identity information, and the beam identity is used to uniquely identify the beam. After the receiver 810 of the UE receives the beam, the transmitter 830 sends a random access preamble to the base station.

Optionally, if the random access preamble or a time-frequency domain resource of a random access channel corresponds to the beam, the time-frequency domain resource of the random access channel is used by the UE to send a preamble. For example, a preamble corresponds to the beam. The processor 820 of the UE is configured to command the transmitter 830 to send the corresponding random access preamble according to a correspondence between the random access preamble and the beam. Details are as follows:

The UE identifies the first beam identity information by means of synchronization channel detection.

The receiver 810 of the UE receives a system message and obtains physical random access channel (PRACH) resource configuration information. The physical random access channel resource configuration information includes random access preamble configuration information, and the random access preamble information is grouped according to a beam identity, that is, the beam corresponds to the random access preamble. It should be noted that the UE may receive the system message before receiving the beam or after receiving the beam, that is, the UE needs to obtain the system message before the UE needs to use the correspondence between the beam and the random access preamble.

The processor 820 selects a corresponding random access preamble according to a beam on which the UE currently resides, to initiate a random access process, so that the base station determines a location of the UE according to a received random access preamble. The base station sends a random access response (RAR) message in a direction of the location of the UE, and the base station may include first beam identity information. After the receiver 810 of the UE receives the RAR message, the transmitter 830 sends a random access message 3 to the base station, the random access message 3 may include second beam identity information, and the second beam identity information in the random access message 3 may be different from the random access preamble or corresponding second beam identity information in the RAR. For example, the UE moves to another beam in the random access process. A form of the second beam identity information may be Media Access Control layer control element MAC CE, and the random access message 3 may further include UE identity information, such as S-TMSI.

After receiving the random access message 3, the base station sends a contention resolution message by using a beam, and the beam points to a beam location corresponding to the beam identity information added by the UE to the random access message 3. If the UE does not add new beam identity information to the random access message 3, the beam of the contention resolution message points to the random access preamble or a beam location corresponding to the beam identity information in the RAR.

The UE sends the second beam identity information to the base station by using the transmitter 830. Optionally, the UE sends the second beam identity information when a preset condition is satisfied. Specifically, the processor 820 of the UE determines whether a preset reporting condition is satisfied. When the processor 820 determines that the preset reporting condition is satisfied, the UE sends the second beam identity information.

The preset condition may be that when the UE moves and enters different beam coverage areas, the UE identifies, by means of synchronization channel detection, that beam identity information changes. When this condition is satisfied, the UE sends the second beam identity information, which includes beam identity information of a beam on which the UE resides after movement. The UE may send the second beam identity information to the base station in at least one of the following manners, for example, by means of a physical uplink control channel PUCCH, a PUSCH, a MAC CE, or RRC signaling.

The preset condition may further be that when the UE needs to communicate data, the UE sends wave identity information. For example, when uplink data of the UE arrives, if the UE and the base station maintain uplink synchronization, the UE may directly send the second beam identity information. If the UE already loses uplink synchronization, the UE needs to report the second beam identity information by means of a random access process, and adds the second beam identity information to a random access message 3 and sends the random access message 3.

Alternatively, the preset condition may be that when migrating from a discontinuous reception DRX inactive state (inactive time) to an active state (active time), the UE reports the second beam identity information;

when migrating from a deactivated state to an activated state in a millimetric wave secondary cell, the UE reports the second beam identity information; or when receiving a paging paging message of the base station, the UE sends the second beam identity information.

Optionally, the base station sends a request message to the UE, where the request message is used to instruct the UE to send the second beam identity information. After receiving the request message, the UE sends the second beam identity information to the base station.

The base station receives the second beam identity information sent by the transmitter 830 of the UE, where the second beam identity information corresponds to the first beam identity information, and the second beam identity information is used to indicate a beam on which the UE resides.

The base station determines a current location of the UE according to the current identity information sent by the transmitter 830. That is, the base station may obtain the beam on which the UE resides and further obtain the current location of the UE according to the received current identity information of the UE.

In another embodiment of the present application, a base station sends at least one beam, where each beam includes first beam identity information, and the first beam identity information is used to uniquely identify the beam.

The base station sends a dedicated random access preamble PRACH random access preamble to multiple beam locations and specifies a random access resource, and the random access resource includes a time-frequency domain resource.

The receiving module 810 of the UE sends the random access preamble to the base station by using the dedicated random access preamble and the random access resource specified by the base station.

The base station determines a beam location of the UE according to a direction of arrival (DOA) of a beam and/or an angle of arrival (AOA) of a beam of the random access preamble, and sends an RAR to one or more beam directions.

The UE receives the RAR and completes a random access process.

Optionally, the UE sends the beam identity information when a preset condition is satisfied. Specifically, the UE determines whether a preset reporting condition is satisfied. When the UE determines that the preset reporting condition is satisfied, the UE sends the second beam identity information.

The preset condition may be that when the UE moves and enters different beam coverage areas, the UE identifies, by means of synchronization channel detection, that beam identity information changes. When this condition is satisfied, the UE actively sends the second beam identity information, which includes beam identity information of a beam on which the UE resides after movement. The UE may send the second beam identity information to the base station in at least one of the following manners, for example, by means of a physical uplink control channel PUCCH, a PUSCH, a MAC CE, or RRC signaling.

Alternatively, the preset condition may be that when the UE needs to communicate data, the UE sends wave identity information. For example, when uplink data of the UE arrives, if the UE and the base station maintain uplink synchronization, the UE may directly send the second beam identity information. If the UE already loses uplink synchronization, the UE needs to report the second beam identity information by means of a random access process, and adds the second beam identity information to a random access message 3 and sends the random access message 3.

Alternatively, the preset condition may be that when migrating from a discontinuous reception DRX inactive state (inactive time) to an active state (active time), the UE reports the second beam identity information;

when migrating from a deactivated state to an activated state in a millimetric wave secondary cell, the UE reports the second beam identity information; or when receiving a paging paging message of the base station, the UE sends the second beam identity information.

Optionally, the base station sends a request message to the UE, where the request message is used to instruct the UE to send the second beam identity information. After the UE receives the request message, the transmitter 830 sends the second beam identity information to the base station.

The base station receives the second beam identity information sent by the UE, where the second beam identity information corresponds to the first beam identity information, and the second beam identity information is used to indicate a beam on which the UE resides.

The base station determines a current location of the UE according to the current identity information sent by the UE. That is, the base station may obtain the beam on which the UE resides and further obtain the current location of the UE according to the received current identity information of the UE.

In this embodiment of the present application, beamforming is performed on a common signal. In a method of scrambling a beam identity by using a synchronization channel, UE detects beam information most rapidly, and beam identity information detected by the UE is reported in a random access process, so that a base station obtains beam location information of the UE. The UE can report the beam identity information in real time or report the beam identity information as required, so that the base station can trace a beam location in which the UE is located, and use the beam location in a subsequent communication process, thereby resolving a coverage problem of a common channel.

The foregoing descriptions are merely examples of embodiments of the present application, but are not intended to limit the present application. Any modification, equivalent replacement, and improvement made without departing from the spirit and principle of the present application shall fall within the protection scope of the present application.

What is claimed is:

1. A method for obtaining a location of a user equipment (UE), comprising:

sending, by a base station to the UE, at least one beam, wherein each beam comprises first beam identity information, the first beam identity information is used to uniquely identify the at least one beam;

receiving, by the base station, second beam identity information from the UE, and the second beam identity information is used to indicate a beam on which the UE resides;

communicating, by the base station, with the UE according to the beam on which the UE resides;

receiving, by the base station, a random access preamble, wherein the random access preamble is received from the UE after the UE receives the at least one beam; and determining, by the base station, a location of the UE according to a correspondence between the at least one beam and a time-frequency domain resource used by the UE to send the random access preamble, wherein before the receiving, by the base station, the second beam identity information sent by the UE, the method further comprises:

sending, by the base station, a request message, wherein the request message is used to instruct the UE to send the second beam identity information.

2. The method according to claim 1, wherein:

the first beam identity information is a code of a beam identity or a beam identity; and the second beam identity information corresponds to the code of the first beam identity or the beam identity.

3. A base station, wherein the base station comprises:

a transmitter, wherein the transmitter is configured to send at least one beam to a user equipment (UE), wherein each beam comprises first beam identity information, the first beam identity information is used to uniquely identify the beam; and a receiver, wherein the receiver is configured to receive second beam identity information from the UE, and the second beam identity information is used to indicate a beam on which the UE resides, wherein the transmitter and the receiver are configured to communicate with the UE according to the beam on which the UE resides, wherein the receiver is further configured to receive a random access preamble, wherein the random access preamble is sent by the UE after the UE receives the at least one beam, and the base station further comprises a processor, the processor is configured to determine a current location of the UE according to a correspondence between the at least one beam and a time-frequency domain resource used by the UE to send the random access preamble, wherein the transmitter is further configured to send a request message, wherein the request message is used to instruct the UE to send the second beam identity information.

4. The base station according to claim 3, wherein:

the first beam identity information is a code of a beam identity or a beam identity; and the second beam identity information corresponds to the code of the first beam identity or the beam identity.

5. The base station according to claim 3, further comprising a processor configured to process each beam, so that each beam comprises the first beam identity information, and the first beam identity information is used to uniquely identify the beam.

6. A user equipment (UE), comprising:

a receiver, wherein the receiver is configured to receive a beam sent by a base station, wherein the beam comprises first beam identity information, and the first beam identity information is used to uniquely identify the beam;

a processor, wherein the processor is configured to generate second beam identity information, and the second beam identity information is used to indicate a beam on which the UE resides; and a transmitter, wherein the transmitter is configured to send the second beam identity information to the base station, so that the base station communicates with the UE according to the beam on which the UE resides, wherein the transmitter is further configured to send a random access preamble, so that the base station determines a current location of the UE according to the random access preamble, and wherein the processor is further configured to command the transmitter to send the random access preamble by using a corresponding time-frequency domain resource according to a correspondence between the beam and the time-frequency domain resource used by the random access preamble, wherein the receiver is further configured to receive a request message sent by the base station, wherein the request message is used to instruct the UE to send the second beam identity information.

7. The UE according to claim 6, wherein the processor is further configured to determine whether a preset reporting condition is satisfied, wherein when the processor determines that the preset reporting condition is satisfied, the transmitter sends the second beam identity information, and wherein the preset condition is that:

when the UE switches from a discontinuous reception DRX inactive state to an active state, the transmitter sends the second beam identity information; or when the UE switches from a discontinuous reception DRX inactive state to an active state, and detected first beam identity information is different from first beam identity information detected earlier, the transmitter sends the second beam identity information; or when the UE switches from a deactivated state to an activated state in a millimeter wave secondary cell, the transmitter sends the second beam identity information; or when the UE switches from a deactivated state to an activated state in a secondary cell, and detected first beam identity information is different from first beam identity information detected earlier, the transmitter sends the second beam identity information; or when the UE detects that first beam identity information is different from first beam identity information detected earlier, the transmitter sends the second beam identity information; or when the UE receives a paging message of the base station, the transmitter sends the second beam identity information.

8. The UE according to claim 6, wherein:

the first beam identity information is a code of a beam identity or a beam identity; and the second beam identity information corresponds to the code of the first beam identity or the beam identity.

* * * * *